(12) United States Patent
Riley

(10) Patent No.: US 8,295,411 B2
(45) Date of Patent: Oct. 23, 2012

(54) METHOD AND SYSTEM FOR MAINTAINING INTEGRITY OF A BINARY OFFSET CARRIER SIGNAL

(75) Inventor: Stuart Riley, San Jose, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 917 days.

(21) Appl. No.: 12/390,115

(22) Filed: Feb. 20, 2009

(65) Prior Publication Data

US 2010/0124255 A1    May 20, 2010

Related U.S. Application Data

(60) Provisional application No. 61/114,976, filed on Nov. 14, 2008.

(51) Int. Cl.
*H03D 1/00* (2006.01)

(52) U.S. Cl. ........ 375/343; 375/342; 375/340; 375/316; 375/130; 375/147

(58) Field of Classification Search .................. 375/343, 375/342, 340, 316, 147, 130
See application file for complete search history.

(56) References Cited

U.S. PATENT DOCUMENTS

2008/0137714 A1 *   6/2008   Lionel et al. .................. 375/130

* cited by examiner

*Primary Examiner* — Zewdu Kassa

(57) ABSTRACT

Embodiments of the present technology recite a method and system for maintaining integrity of a binary offset carrier (BOC) signal. In one embodiment, a first correlator is configured for multiplying a timing signal with an internally generated pseudo-random noise (PRN) signal to create a reference signal. The first correlator is further configured for combining the reference signal with a received PRN signal and outputting a first correlation function based upon the combining. A second correlator is configured for multiplying the internally generated PRN signal with the received PRN signal and for outputting an integrity correlation function. A comparison component is configured for determining the offset of the reference signal relative to the received PRN signal based upon a comparison of the integrity correlation function with the first correlation function.

26 Claims, 10 Drawing Sheets

140

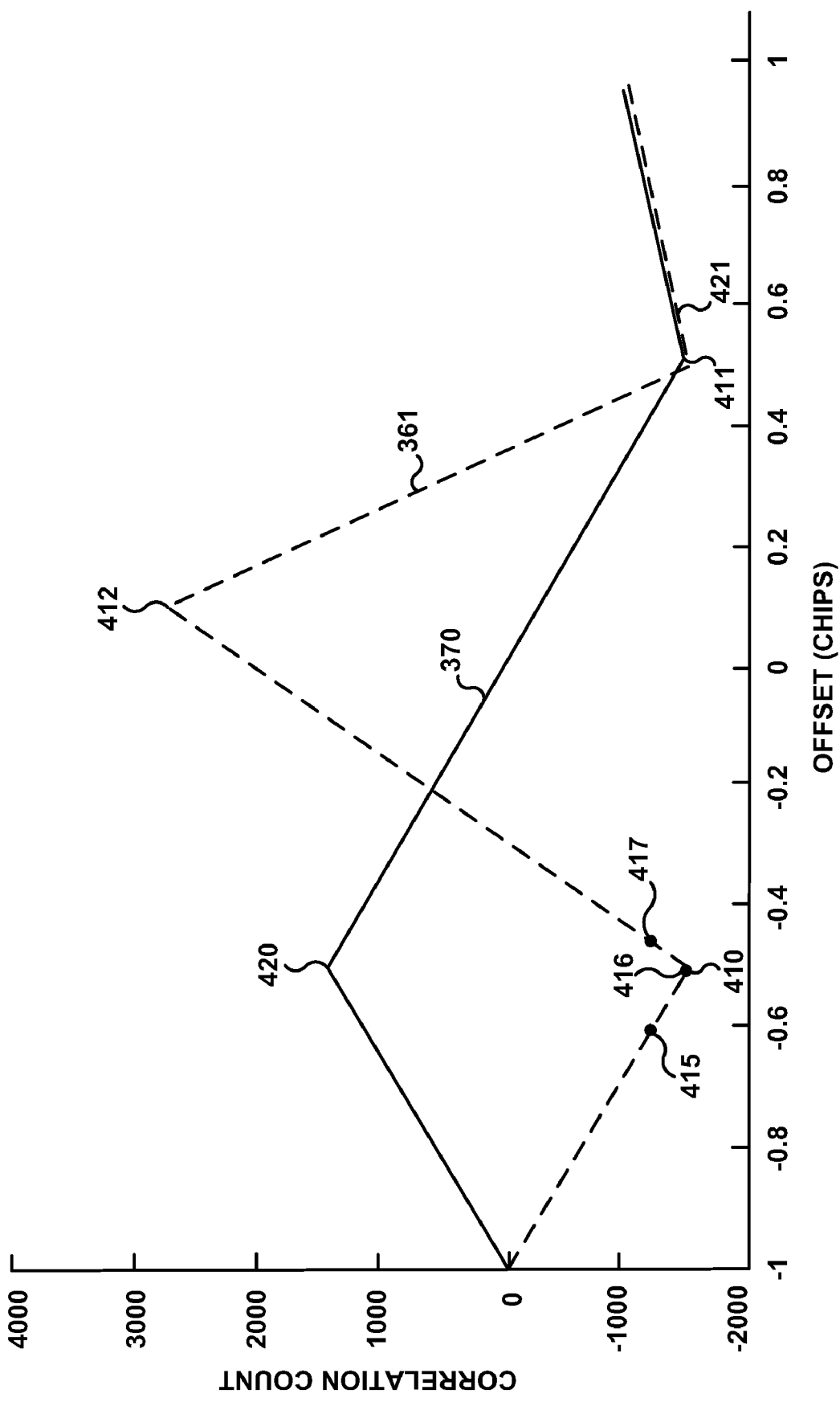

METHOD AND SYSTEM FOR MAINTAINING INTEGRITY OF A BINARY OFFSET CARRIER SIGNAL

RELATED U.S. APPLICATION

This application claims priority to the provisional patent application, Ser. No. 61/114,976, entitled "METHOD AND SYSTEM FOR MAINTAINING INTEGRITY OF A BINARY OFFSET CARRIER SIGNAL," with the filing date Nov. 14, 2008, assigned to the assignee of the present application, and hereby incorporated by reference in its entirety.

FIELD OF THE INVENTION

Embodiments of the present technology are related to the field of satellite navigation systems.

BACKGROUND

Most conventional Global Navigation Satellite System (GNSS) receivers utilize one or more correlators to acquire, track, and demodulate signals transmitted from orbiting satellites. For example, each Global Positioning System (GPS) satellite transmits a signal with a 1.023 Mchip per second spread rate over a carrier frequency at 1575.42 MHz. Each satellite transmits a unique pseudo-random noise code (PRN) which identifies that particular satellite and facilitates simultaneously receiving signals transmitted by a plurality of satellites in view of the receiver. The PRN code is 1023 chips, corresponding to a 1 millisecond time period. One or more correlators are used to track a PRN signal by comparing the PRN signal received from a satellite with an internally generated reference signal. Typically, the correlation process includes multiplying and integrating the received and internally generated signals. The correlator then generates a correlation signal indicating the result of the comparison. The power of the correlation signal is often accumulated for a period of time known as the "pre-detection interval" (PDI). The accumulated result is then used to adjust the timing of the internally generated signal in order to align it more closely with the received signal in the next pre-detection interval.

FIG. 1A is a block diagram of a conventional GPS correlator 100. Correlator 100 comprises an input 101 in which a GPS baseband signal is input into a multiplier 105 which receives an internally generated PRN signal from a PRN generator 111 via input 110. A resulting set of signals is accumulated and integrated by summing component 120. During acquisition, a comparator 125 indicates when a match between the internally generated PRN signal and the received PRN signal has occurred based upon a pre-set threshold level. A processor 130 receives the signals from comparator 125 and outputs a signal to numerically controlled oscillator (NCO) 135 which controls the timing of the PRN signal from PRN generator 111. As a result of these adjustments, the received signal and the internally generated signal may become aligned in time. Typically, in steady state tracking the signal from summing component 120 is accessed directly by processor 130.

FIG. 1B shows an exemplary correlation function 140 generated by a convention GPS correlator (e.g., 100 of FIG. 1A). In many global positioning systems, this is referred to as a "correlation function." A typical GPS correlation function is a substantially triangular peak with some rounding and asymmetry introduced due to signal filtering and other effects. A maximum accumulated value 150 is shown at the top of the triangular peak for a given pre-detection interval. Thus, the internally generated signal is punctual ("P") with respect to the received signal. Using a single correlation function, it is difficult to determine whether to advance or delay the internally generated PRN signal (e.g., from PRN generator 111) such that it is aligned with the received PRN signal in the next pre-detection interval. As a result, some receivers use at least one other correlator which generates an internally generated PRN signal which is leading, or early ("E"), with respect to the received signal. Similarly, the internally generated signal may be lagging, or late ("L"), with respect to the received signal Under most conditions, when the punctual internally generated PRN signal is aligned with the received PRN signal, the early correlator and late correlator produce accumulated results which have a known relationship with respect to each other and with the accumulated result from the punctual correlator. As shown in FIG. 1B, points 161 and 162 have the same value when the result from the punctual correlator is aligned with the received PRN signal (e.g., point 150). Often, an early-minus-late correlator subtracts the late correlation signal from the early correlation signal. Thus, if the internally generated P signal was early with respect to the received PRN signal, a negative value would be obtained from the early-minus-late correlator. Similarly, if the internally generated P signal was late with respect to the received PRN signal, a positive value would be obtained from the early-minus-late correlator. Ideally, if the P signal is aligned with the received PRN signal, a value of zero would be obtained by the early-minus-late correlator. The term "integrity" refers to correctly identifying and tracking the received PRN signal using the internally generated PRN signal.

The Galileo satellite navigation system also transmits a PRN code in the L1 band which is centered at 1575.420 MHz and has a transmitted bandwidth of 40.92 MHz. For example, a PRN signal with a chipping rate of 1.023 MHz from a Galileo satellite is multiplied by a 1.023 MHz square wave signal to produce a Binary Offset Carrier (BOC (1,1)) signal which is transmitted by a navigation satellite. It is noted that other ratios of the chipping rate and square wave signal may be used. FIG. 2A is a block diagram of a conventional Galileo correlator 200. Correlator 200 comprises an input 201 in which a received BOC (1,1) signal is input into a multiplier 205. Multiplier 205 also receives a BOC (1,1) reference signal from multiplier 250 in which an internally generated PRN signal from a PRN generator 240 is multiplied with a square wave signal 245 which is generated by, for example, a 1.023 MHz clock. A resulting set of signals is accumulated and integrated by summing component 220. During acquisition, a comparator 225 indicates when a match between the internally generated BOC (1,1) reference signal and the received BOC (1,1) signal has occurred based upon a pre-set threshold level. A processor 230 receives the signals from comparator 225 and outputs a signal to numerically controlled oscillator (NCO) 225 which controls the timing of the PRN signal from PRN generator 240. Typically, in steady state tracking the signal from summing component 220 is accessed directly by processor 230.

FIG. 2B shows a correlation function 255 generated by a conventional Galileo correlator (e.g., 200 of FIG. 2A). As shown in FIG. 2B, the correlation function generated when a BOC (1,1) reference signal is combined with a received PRN signal shows a sharp central peak 260 as well as two smaller negative side peaks 261 and 262. The difficulty with using a BOC (1,1) reference signal is that a correlator may latch onto any of peaks 260, 261, or 262 when attempting to align its internally generated BOC (1,1) reference signal with the received BOC (1,1) signal. In other words, rather than correctly aligning the internally generated P signal with peak 260, a receiver may attempt to align the P signal with either of peaks 261 or 262, resulting in an error of approximately 150 meters in determining the geographic position of the receiver. Additionally, the polarity of the correlation function flips 180 degrees based upon what data bit is received. Thus, while correlation function 255 shows a data bit with a value of one, a data bit with a value of zero would show peak 260 pointed downward and peaks 261 and 262 pointed up. As a result, reading the sign of the voltage of correlation function 255 does not facilitate determining whether the internally generated PRN signal is correctly aligned with the received BOC (1,1) signal.

SUMMARY

Embodiments of the present technology recite a method and system for maintaining integrity of a binary offset carrier (BOC) signal. In one embodiment, a first correlator is configured for multiplying a timing signal with an internally generated pseudo-random noise (PRN) signal to create a reference signal. The first correlator is further configured for combining the reference signal with a received PRN signal and outputting a first correlation function based upon the combining. A second correlator is configured for multiplying the internally generated PRN signal with the received PRN signal and for outputting an integrity correlation function. A comparison component is configured for determining the offset of the reference signal relative to the received PRN signal based upon a comparison of the integrity correlation function with the first correlation function.

BRIEF DESCRIPTION OF THE DRAWINGS

The accompanying drawings, which are incorporated in and form a part of this specification, illustrate embodiments of the present technology and, together with the description, serve to explain the principles of the technology. Unless specifically noted, the drawings referred to in this description should be understood as not being drawn to scale.

FIG. 4B shows an example of a first correlation function and a corresponding integrity correlation function generated in accordance with one embodiment.

DESCRIPTION OF EMBODIMENTS

Reference will now be made in detail to various embodiments, examples of which are illustrated in the accompanying drawings. While the subject matter will be described in conjunction with these embodiments, it will be understood that they are not intended to limit the subject matter to these embodiments. Furthermore, in the following description, numerous specific details are set forth in order to provide a thorough understanding of the subject matter. In other instances, well-known methods, procedures, objects, and circuits have not been described in detail as not to unnecessarily obscure aspects of the subject matter.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that in one embodiment of the present technology, discussions utilizing terms such as "multiplying," "combining," "outputting," "determining," "comparing," "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 3:
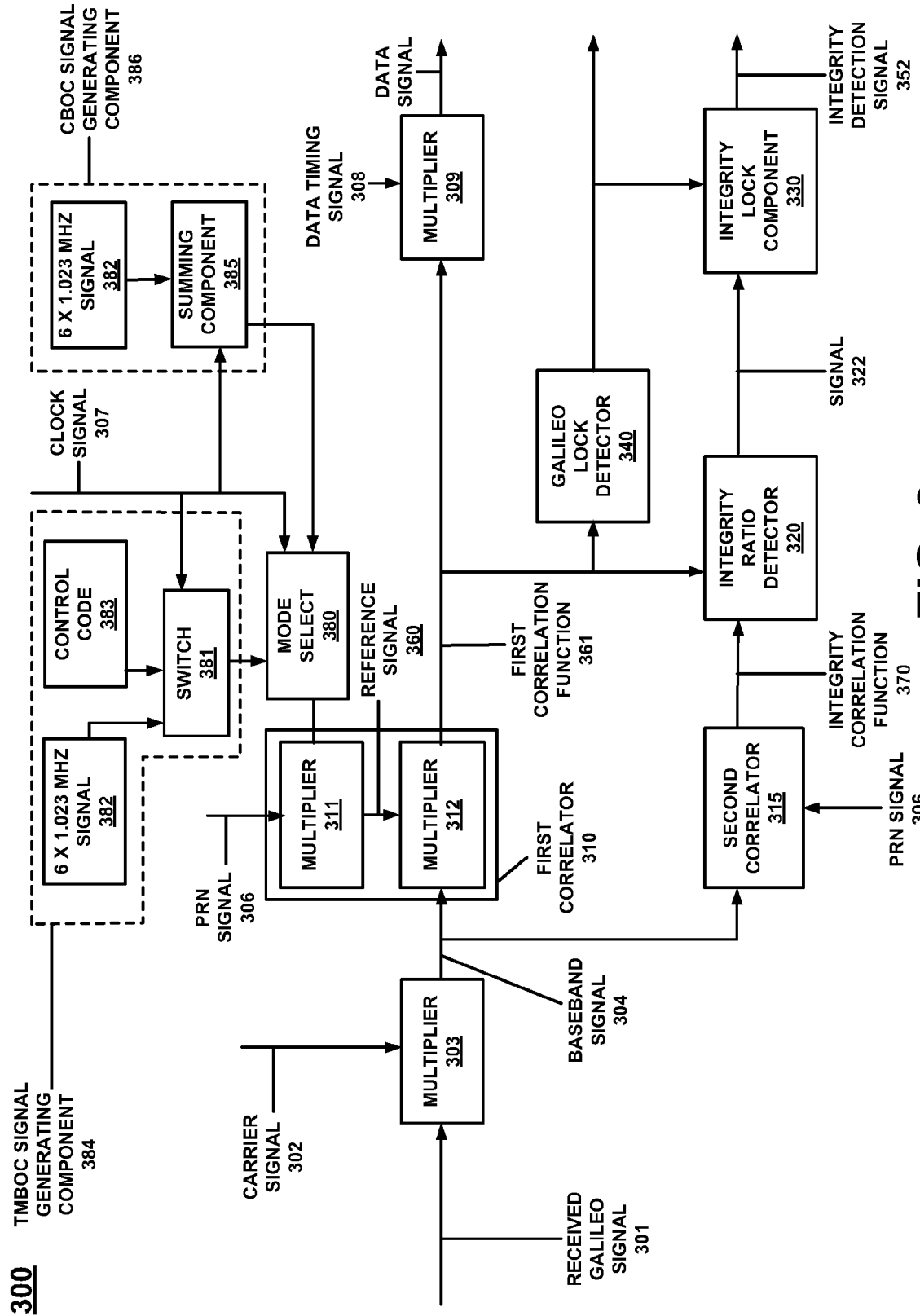
FIG. 3 is a block diagram of a GNSS receiver in accordance with one embodiment.

FIG. 3 is a block diagram of a GNSS receiver 300 in accordance with an embodiment of the present technology. In one embodiment, GNSS receiver 300 is used to generate an integrity correlation function based upon a received Galileo signal, a pseudo-random noise signal, and a timing signal. These signals are transformed by GNSS receiver 300 to create the integrity correlation function which is then used to determine if the timing of the pseudo-random noise signal is correct, or should be advanced or delayed to align the timing of the pseudo-random noise signal with the received Galileo signal. It is noted that in one embodiment, the components described below are implemented as discreet hardware components. Furthermore, the functionality of components described herein may be integrated into other components. In another embodiment, the functionality of the components described below may be implemented as computer executable instructions stored on a computer readable medium. Alternatively, a variety of hardware, software, and/or computer firmware components can be used to implement GNSS receiver 300 as described herein. In one embodiment, clock signal 307 is a 1.023 MHz signal. In FIG. 3, a received Galileo signal 301 is input into a multiplier 303 and multiplied with a carrier signal 302 which creates an essentially baseband signal 304. In one embodiment, received Galileo signal 301 is a BOC (1,1) signal. In another embodiment, received Galileo signal 301 comprises a Modified Binary Offset Carrier (MBOC) signal. Signal 304 is then input into a first correlator 310 and a second correlator 315. In one embodiment, first correlator 310 comprises a multiplier 311 which multiplies a pseudo-random noise (PRN) signal 306 with a clock signal 307 which is accessed via a mode select component 380. In one embodiment, in response to a control code 383 which designates which clock signal to access, mode select component 380 selectively couples multiplier 311 with switch 381, clock signal 307, or with summing component 385. As will be discussed in greater detail below, mode select component 380 allows selecting between a variety of BOC signal modes. In one embodiment, PRN signal 306 is generated internally by GNSS receiver 300 and is used to demodulate received Galileo signal 301. As a result of multiplying the PRN signal 306 with the clock signal 307, a reference signal 360 is output by multiplier 311 which is input to multiplier 312. In one embodiment, received Galileo signal 301 and reference signal 306 are BOC (1,1) signals. In another embodiment, received Galileo signal 301 and/or reference signal 306 are implemented as MBOC signals. Multiplier 312 then multiplies the reference signal 360 with a received Galileo signal 301 and outputs a first correlation function 361. In one embodiment, first correlation function 361 is input into a multiplier 309 with data timing signal 308 to output a data signal 350. In one embodiment, first correlation function 361 is also input into a Galileo lock detector 340 which is used to track and maintain a lock upon received Galileo signal 301. In one embodiment, Galileo lock detector 340 determines whether the timing of clock signal 307 is in correct phase with received Galileo signal 301.

GNSS receiver 300 also comprises a second correlator 315 which multiplies PRN codes 306 with the received Galileo signal 301. Second correlator 315 then outputs an integrity correlation function 370. In embodiments of the present technology, GNSS receiver 300 uses integrity correlation function 370 to detect whether a correct peak of first correlation function is being tracked and to control the timing of PRN signal 306.

In another embodiment, GNSS receiver can be used to access an MBOC signal. One implementation of the MBOC set of signals is the Composite Binary Offset Carrier (CBOC) signal which can be implemented by the Galileo system. Another implementation is the Time Multiplexed Binary Offset Carrier (TMBOC) signal which is implemented as the GPS L1C signal. Currently, some implementations of the CBOC and TMBOC signals superimpose a 6×1.023 MHz signal upon clock signal 307. The resulting correlation function is similar to that generated by a BOC (1,1) signal, but with some additional contouring as shown in FIG. 4D. Using mode select component 380, GNSS receiver 300 can select which clock signal to access based upon which implementation of the BOC signal is being accessed. In the CBOC mode, an amplitude modulation is superimposed on top of the basic BOC signal. This results in some ripple which is exhibited on the correlation function. In the example of FIG. 3, a CBOC signal is demodulated by combining clock signal 307 with a 6×1.023 MHz signal 382 by summing component 385. In the example of FIG. 3, summing component 385, clock signal 307 and 6×1.023 MHz signal 382 are integrated as a CBOC signal generating component 386. It is noted that 6×1.023 MHz signal 382 can be generated by CBOC signal generating component 386, or received from another source. In general, clock signal 307 and 6×1.023 MHz signal 382 are multiplied by gain terms before being sent to summing component 385. One example of the operation of summing component 382 is shown by the example equation:

$$A(1.023 \text{ MHz}) + B(6 \times 1.023 \text{ MHz})$$

In one embodiment, $A=\sqrt{(10/11)}$, and $B=\sqrt{(1/11)}$. It is noted that other received signals may utilize other gain terms for A and B in other embodiments.

In the TMBOC mode, the 6×1.023 MHz signal 382 is selectively multiplexed coupled with mode select component 380 using switch 381. As a result, either of clock signal 307 and 6×1.023 MHz signal 382 is combined with PRN signal 306. In one embodiment, the selection of clock signal 307 or 6×1.023 MHz signal 382 by switch 381 is based upon control code 383. In the example of FIG. 3, switch 381, clock signal 307, control code 383, and 6×1.023 MHz signal 382 are integrated as a TMBOC signal generating component 384. It is noted that 6 X 1.023 MHz signal 382 and/or control code 383 can be generated by TMBOC signal generating component 384, or received from another source. As an example, one implementation of the GPS L1C specification uses a repeating 33 bit control code (e.g., control code 383). During bits 0, 4, 6, 29, 33, 37, 39, 62, etc. control code 383 causes switch 381 to access 6×1.023 MHz signal 382 which is then accessed by multiplier 311 via mode select component 380. Otherwise, clock signal 307 is accessed by multiplier 311 via mode select component 380.

Figure 1A:
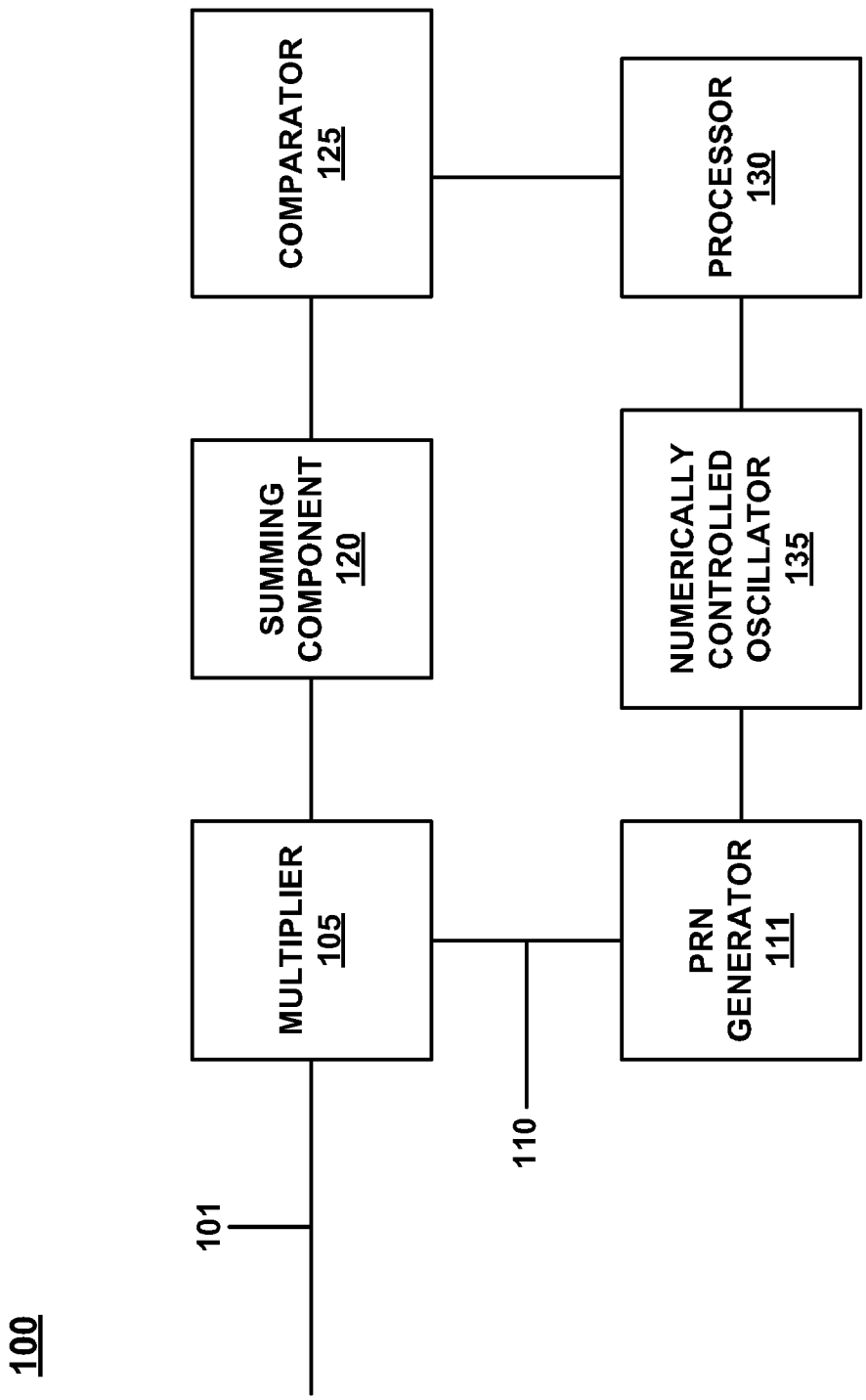
FIG. 1A is a block diagram of a conventional GPS correlator.
Figure 1B:
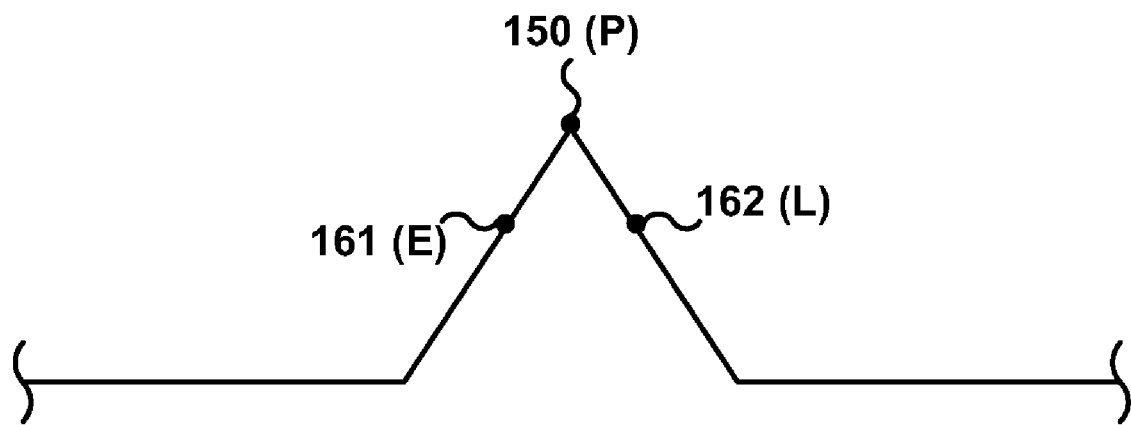
FIG. 1B shows an exemplary correlation function generated by a conventional GPS correlator.
Figure 2A:
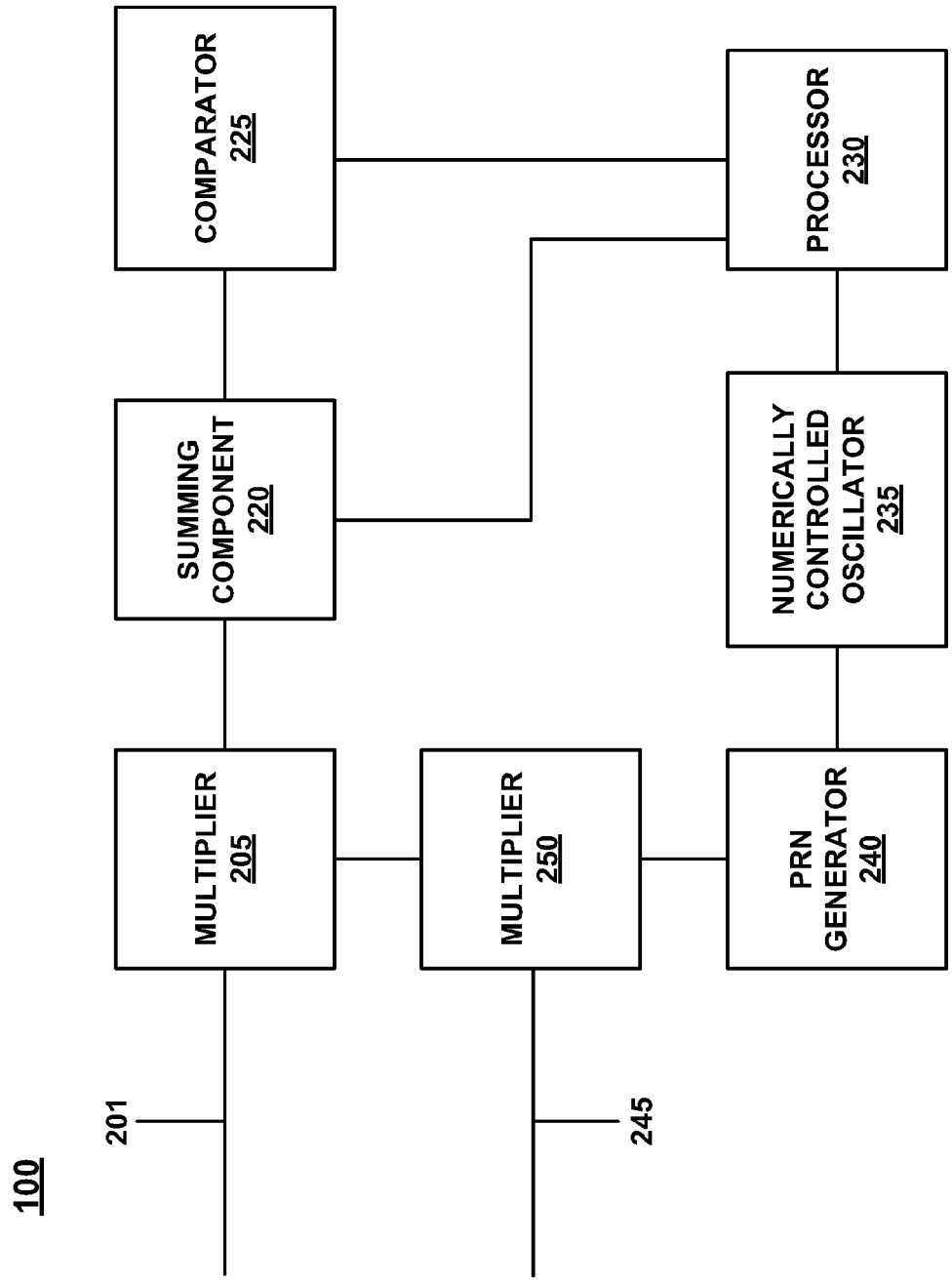
FIG. 2A is a block diagram of a conventional Galileo correlator.
Figure 2B:
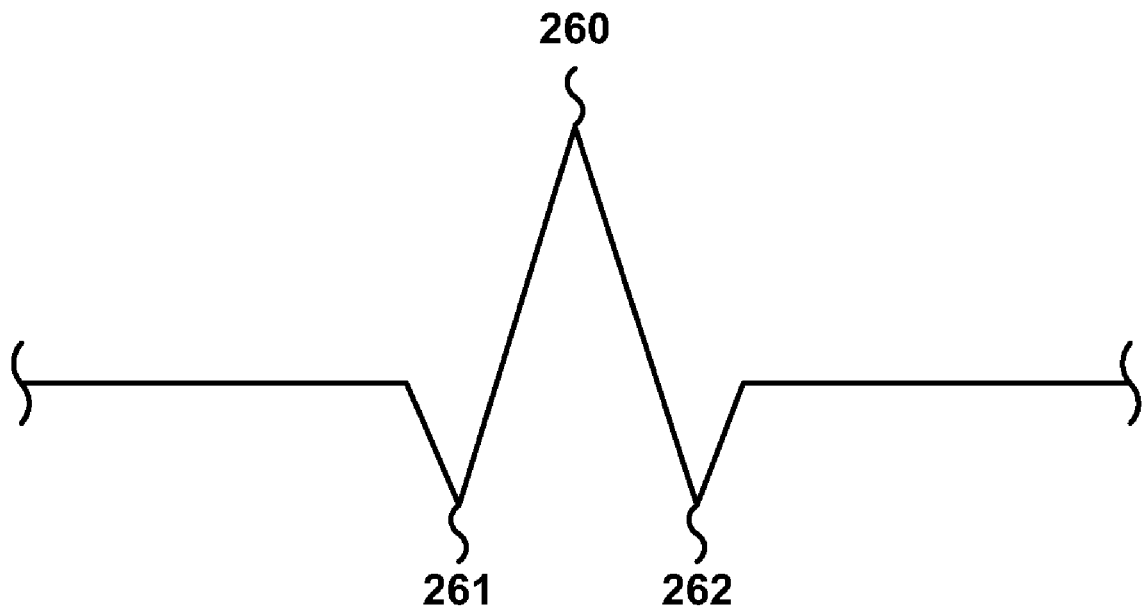
FIG. 2B shows a correlation function 255 generated by a conventional Galileo correlator.
Figure 4A:
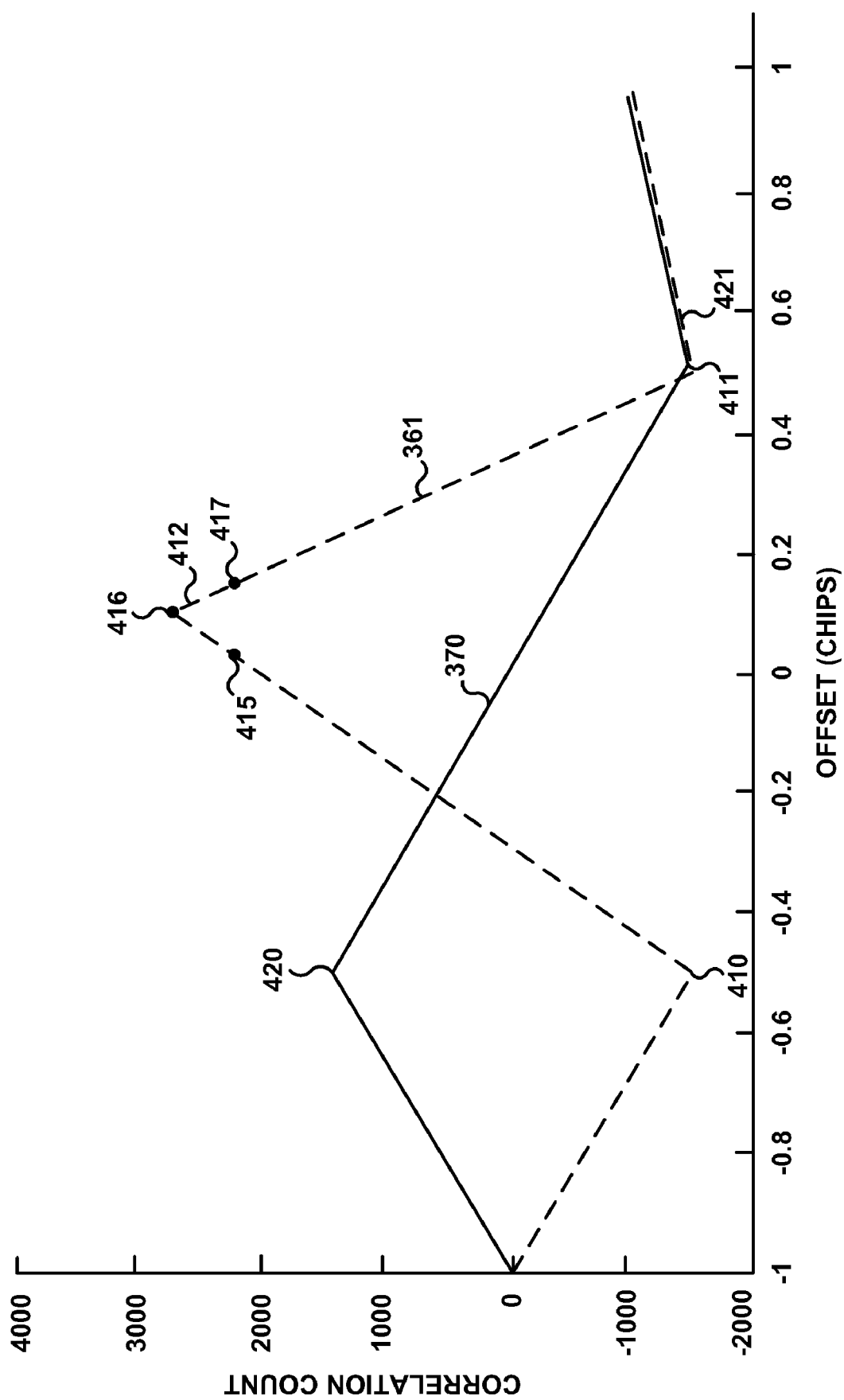
FIG. 4A shows an example of a first correlation function and a corresponding integrity correlation function generated in accordance with one embodiment.

FIG. 4A shows an example of a first correlation function (e.g., 361 of FIG. 3) and a corresponding integrity correlation function (e.g., 370 of FIG. 3) generated in accordance with one embodiment of the present technology. In FIG. 4A, first correlation function 361 is a correlation to a punctual phase of PRN signal 306 and is comparable to correlation function 255 described above with reference to FIG. 2B. As shown in FIG. 4A, first correlation function 361 exhibits peaks 410 and 411 which can be erroneously used by a correlator to control the timing of the internally generated PRN code. First correlation function 361 also exhibits peak 412 which is the correlation peak GNSS receiver 300 should be tracking. As described above, if the correlator latches to either of peaks 410 or 411, an error of approximately 150 meters in incurred in calculating the geographic position of GNSS receiver 300 based upon the received Galileo signal being accessed.

FIG. 4A also shows an integrity correlation function 370 generated by second correlator 315 in accordance with one embodiment. As shown in FIG. 4A, integrity correlation function 370 exhibits peaks 420 and 421. As described above, second correlator 315 generates integrity correlation function 370 by multiplying PRN codes 306 with the received Galileo signal 301.

In one embodiment, integrity ratio detector 320 compares first correlation function 361 and integrity correlation function 370. In one embodiment, integrity ratio detector 320 compares the sign of integrity correlation function 370 and first correlation function 361 to determine if GNSS receiver 300 is tracking the correct peak of reference signal 360. For example, GNSS receiver 300 may be attempting to align its reference signal (e.g., 360 of FIG. 3) with peak 412 of first correlation function 361. In this instance, points 415, 416 and 417 correspond to early, punctual, and late phases of PRN signal 306. In the present example, when GNSS receiver 300 is tracking at peak 412 (e.g., at zero offset), integrity ratio detector 320 examines integrity correlation function 370 at a point that corresponds to first correlation function 361 (e.g., at zero offset). In the present example, when GNSS receiver 300 is tracking first correlation function 361 at peak 412, integrity ratio detector 320 determines that the magnitude of integrity correlation function 370 is approximately zero. It is noted that the value of integrity correlation function 370 may shift slightly in successive iterations. In other words, the value of integrity correlation function 370 may be slightly more than, or less than, zero. More generally, the value of integrity correlation function 370 is within a set of parameters which approximates zero when peak 412 is being tracked. In one embodiment, integrity ratio detector 320 outputs a signal 322 indicating the relationship between first correlation function 361 and integrity correlation function 370. In the present example, signal 322 indicates the correlation count of integrity correlation function 370 is approximately zero, or within an acceptable range thereof. This indicates that the correct peak of first correlation function 361 has been acquired. In one embodiment, signal 322 also indicates the magnitude and sign of first correlation function 361 (e.g., +3000) as well in this instance.

In another example, GNSS receiver 300 may be attempting to align its reference signal (e.g., 360 of FIG. 3) with peak 410 of first correlation function 361. In FIG. 4B, when GNSS receiver 300 is tracking at peak 410 (e.g., at an offset of −0.5 chips), integrity ratio detector 320 examines the portion of integrity correlation function 370 corresponding to an offset of −0.5 chips as well. As shown in FIG. 4B, the magnitude of the correlation count of integrity correlation function 370 is comparable (e.g., approximately 1500) to the corresponding magnitude of the correlation count of first correlation function 361 (e.g., approximately 1500) at peak 420. However, the sign of integrity correlation function 370 is positive at this offset while the sign of first correlation function 361 is negative. In one embodiment, when the sign of integrity correlation function 370 is opposite the sign of first correlation function 361, this indicates that the phase of PRN signal 306 is early with reference to the received Galileo signal 301. In this instance, signal 322 indicates that the sign of first correlation function 361 is opposite to the sign of integrity correlation function 370. In one embodiment, the signal 322 also indicates that the magnitude of integrity correlation function 370 is +1500 while the magnitude of first correlation function 361 is −1500. It is noted that the reference to the magnitude of integrity correlation function 370 (e.g., +1500) is used as an example only. In another case, the waveforms of first correlation function 361 and integrity correlation function 370 may be inverted from those shown in FIGS. 4A, 4B, and 4C.

Alternatively, GNSS receiver 300 may be attempting to align its reference signal (e.g., 360 of FIG. 3) with peak 411 of first correlation function 361. In the present example, when GNSS receiver 300 is tracking at peak 411 (e.g., at an offset of +0.5 chips), integrity ratio detector 320 examines the portion of integrity correlation function 370 corresponding to an offset of +0.5 chips as well. As shown in FIG. 4B, the magnitude of the correlation count of integrity correlation function 370 is comparable (e.g., approximately 1500) to the corresponding magnitude of the correlation count of first correlation function 361 (e.g., approximately 1500) at peak 421. Additionally, the sign of integrity correlation function 370 is negative at this offset, as is the sign of first correlation function 361 is negative. In one embodiment, when the sign of integrity correlation function 370 is the same as the sign of first correlation function 361, this indicates that the phase of PRN signal 306 is late with reference to the received Galileo signal 301. In this instance, integrity ratio detector 320 generates signal 322 which indicates that the sign of first correlation function 361 is the same as the sign of integrity correlation function 370. In one embodiment, the signal 322 also indicates that the magnitude of integrity correlation function 370 is −1500 and that the magnitude of first correlation function 361 is also −1500. It is noted that the reference to the magnitude of integrity correlation function 370 (e.g., −1500) is again used as an example. In another case, the waveforms of first correlation function 361 and integrity correlation function 370 may again be inverted from those shown in FIGS. 4A, 4B, and 4C.

In one embodiment, signal 322 is received by integrity lock component 330. In one embodiment, integrity lock component 330 determines whether the value of integrity correlation function 370 is within a pre-determined range of a correlation count of zero. In so doing, integrity lock component 330 can determine whether the offset of reference signal 360 relative to received Galileo signal 301 is correct, or if the offset of reference signal 360 should be adjusted. In one embodiment, integrity lock component 330 compares the sign of first correlation function 361 and integrity correlation function 370 to determine whether GNSS receiver 300 is correctly aligning PRN signal 306 with received Galileo signal 301. For example, when GNSS receiver 300 is correctly aligning punctual phase of PRN signal 306 (e.g., with peak 412 of first correlation function 361, the correlation count of integrity correlation function 370 will have a value of approximately zero. Again, it is noted that the value of integrity correlation function 370 may fluctuate from an absolute value of zero. Therefore, integrity lock component 330 will determine whether the value of integrity correlation function 370 is within an "acceptable" range of the desired value of zero. As a result of determining that the value of integrity correlation function 370 is within a pre-determined range of a correlation count of zero, integrity lock component 330 also determines that GNSS receiver 300 is correctly aligning PRN signal 306 with received Galileo signal 301. In one embodiment, integrity lock component 330 then generates an integrity detection signal 352 which indicates that GNSS receiver is correctly aligning PRN signal 306 with received Galileo signal 301. In one embodiment, if integrity lock component 330 determines that is correctly aligning PRN signal 306 with received Galileo signal 301, it will not generate integrity detection signal 352.

If GNSS receiver 300 is instead aligning point 416 with peak 410 of first correlation function 361, signal 322 will convey that the sign of first correlation function 361 and the sign of integrity correlation function 370 are opposite. This indicates that GNSS receiver 300 is incorrectly tracking first correlation function 361. This indicates that first correlation function 361 is being tracked at peak 410 (e.g., early) rather than at peak 412. In so doing, integrity lock component 330 has determined that PRN signal 306 has to be shifted approximately 150 meters in the direction of peak 412 by delaying signal 306. In this instance integrity lock component 330 will then generate a signal 352 indicating that the timing of PRN signal 306 has to be delayed such that it is shifted by approximately 150 meters. In so doing, the offset of reference signal 360 will also be delayed and the punctual phase of PRN signal 306 (e.g., point 416) will be aligned, or closely aligned, with peak 412.

If GNSS receiver 300 is instead aligning point 416 with peak 411 of first correlation function 361, signal 322 will convey that the sign of first correlation function 361 and the sign of integrity correlation function 370 are the same. This indicates that GNSS receiver 300 is incorrectly tracking first correlation function 361 (e.g., late). In so doing, integrity lock component 330 has determined that PRN signal 306 has to be shifted approximately 150 meters in the direction of peak 412 by advancing signal 306. In this instance integrity lock component 330 will then generate a signal 352 indicating that the timing of PRN signal 306 has to be advanced such that it is shifted by approximately 150 meters. In so doing, the offset of reference signal 360 will also be advanced and the punctual phase of PRN signal 306 (e.g., point 416) will be aligned, or closely aligned, with peak 412.

In one embodiment, integrity lock component 330 also generates an integrity alarm signal to the software operated by GNSS receiver 300 indicating that there is an error in tracking received Galileo signal 301. In so doing, it can be displayed to a user that the current determined geographic position is in error and that a corrected geographic position will be displayed shortly. In one embodiment, the integrity alarm signal can indicate that Galileo signal 301 is not to be used when generating a position solution by GNSS receiver 300. In other words, the satellite from which Galileo signal 301 is received is excluded by GNSS receiver 300 when generating a position.

One embodiment of the present technology can facilitate initial acquisition of received satellite navigation signals. For example, referring now to FIG. 4C, GNSS receiver 300 may initially align PRN signal 306 at a portion of first correlation function 361 where points 415, 416 and 417 (e.g., early, punctual, and late phases of PRN signal 306 respectively) would initially align on first correlation function 361 as shown. Typically, GNSS receiver 300 would shift the timing of PRN signal 306 to latch onto peak 410. In other words, the timing of PRN signal would be offset to shift punctual phase 416 such that it is centered on peak 410. This would result in an error in the measurement of Galileo signal 301 of approximately 150 meters. Typically, the error in determining the geographic position of GNSS receiver 300 would depend on the number of satellites tracked by GNSS receiver 300 and would typically be less than 150 meters. However, as described above, integrity lock component 330 determines when GNSS receiver 300 has incorrectly latched onto peak 410 by comparing the magnitude and sign of integrity correlation function 370 and of first correlation function 361.

Figure 4C:
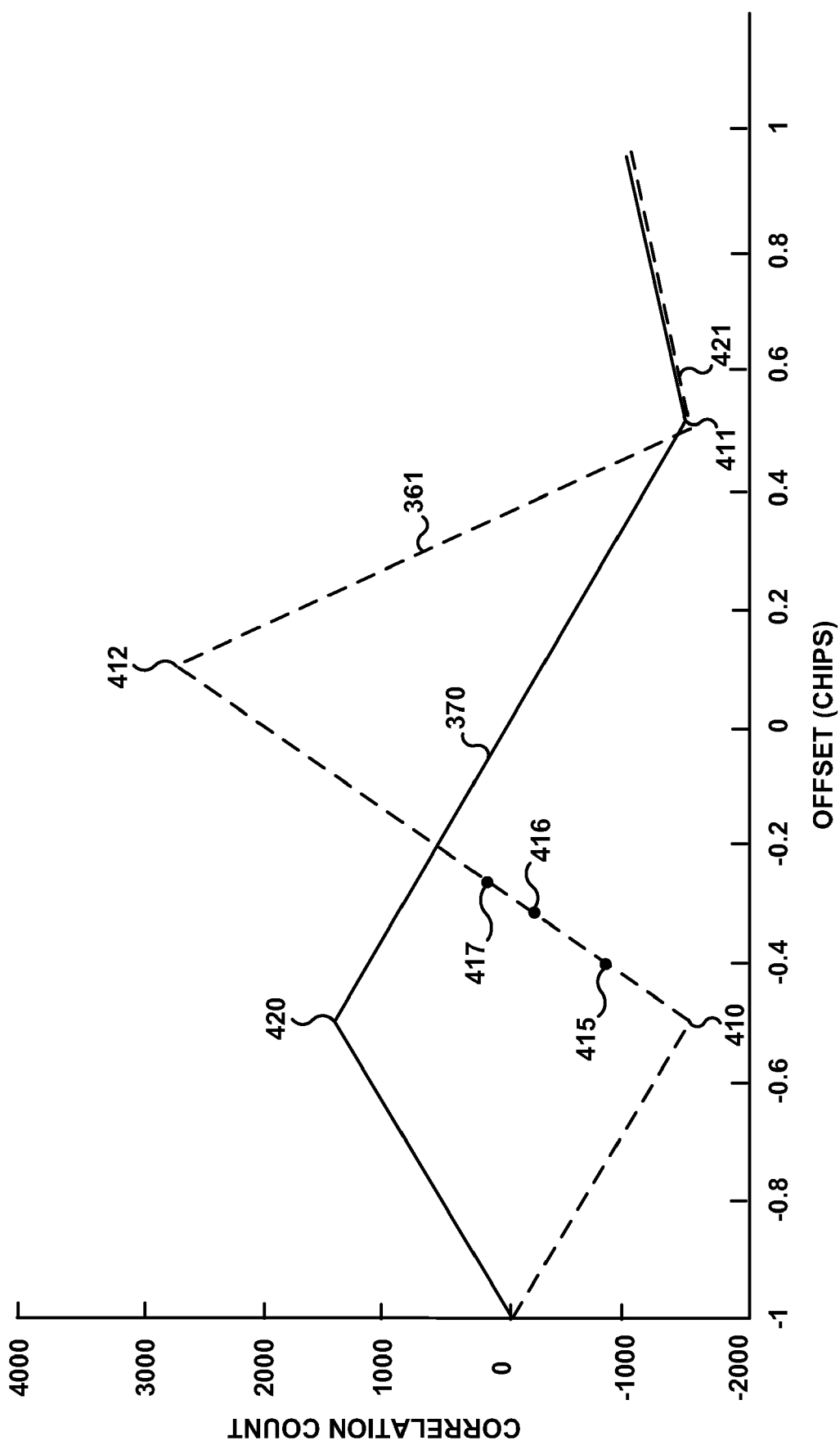
FIG. 4C shows an example of a first correlation function and a corresponding integrity correlation function generated in accordance with one embodiment.
Figure 4D:
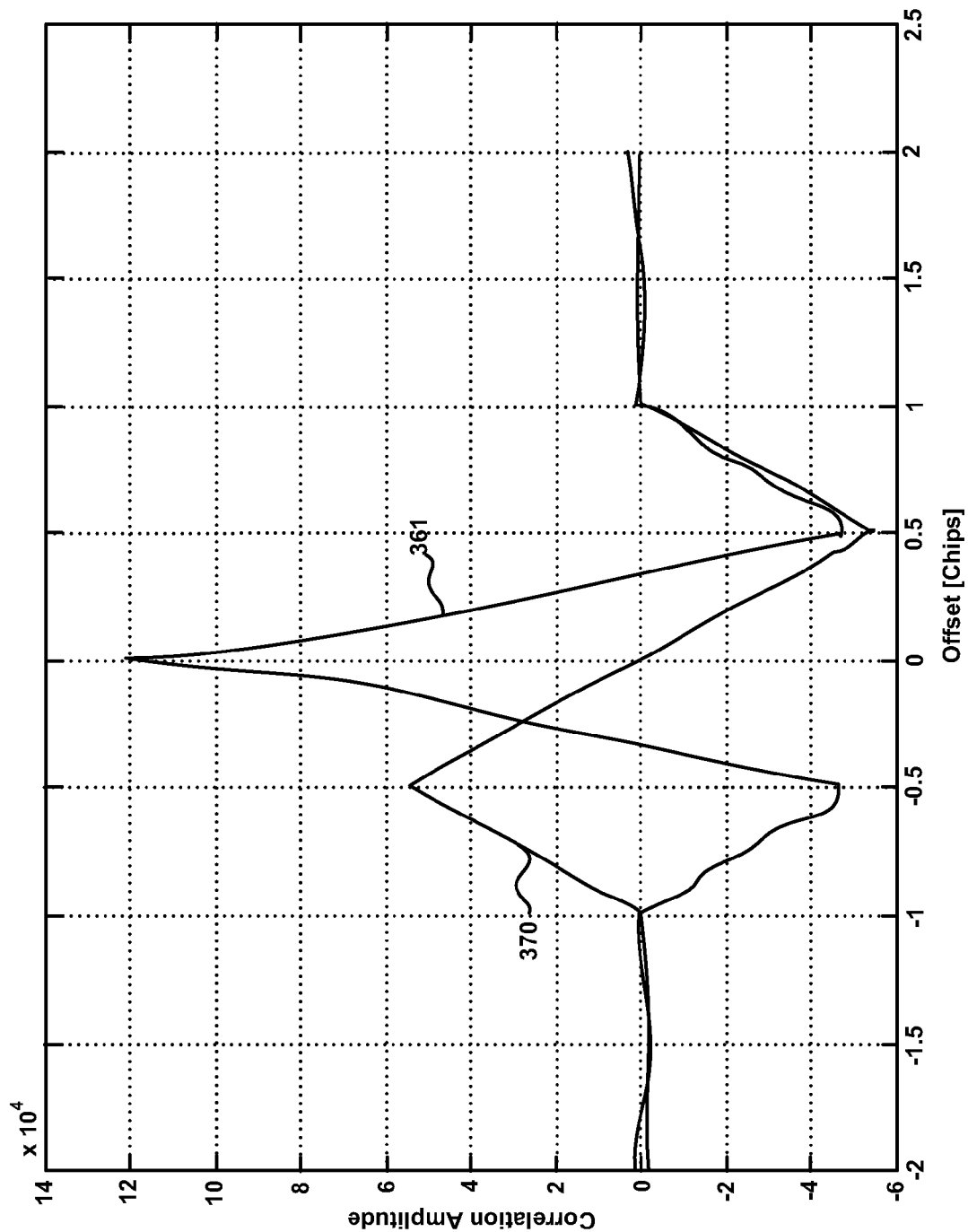
FIG. 4D shows an example of an MBOC first correlation function and a corresponding integrity correlation function generated in accordance with one embodiment.

In another embodiment, integrity ratio detector 320 can determine whether the timing of PRN signal 306 should be advanced or delayed to shift point 416 toward peak 412 without the necessity of centering the punctual phase of PRN signal 306 on either of peaks 410 or 411. In other words, integrity lock tracking a peak of first correlation function 361, but can also determine whether the timing of PRN signal 306 should be advanced or delayed simply by comparing the signs of first correlation function 361 and integrity correlation function 370. In the example of FIG. 4C, while the magnitudes of first correlation function 361 and integrity correlation function 370 are not the same when GNSS receiver is generating a punctual phase of PRN signal 306 as shown in FIG. 4C. However, by comparing the sign of first correlation function 361 (e.g., negative) with the sign of integrity correlation function (e.g., positive) integrity lock component can indicate via integrity detection signal 352 that the timing of PRN signal 306 should be delayed to bring the punctual phase of PRN signal 306 (e.g., point 416) closer to peak 412. As the punctual phase of PRN signal 306 moves close to peak 412, the sign of first correlation function 361 and integrity correlation function 370 will either remain opposite, or be the same at the point where the two functions cross. Integrity lock component 330 can compare the magnitude of those functions at that point to determine that the timing of PRN signal 306 still should be delayed to align its punctual phase (e.g., point 416) with peak 412.

Alternatively, if points 415, 416, and 417 are initially closer to peak 411, the signs of first correlation function 361 and integrity correlation function 370 will be the same. Again, integrity lock component 330 can use this information to determine that the timing of PRN signal 306 should be advanced to bring the punctual phase (e.g., point 416) closer to peak 412. As the punctual phase of PRN signal 306 (e.g., point 416) moves closer to peak 412, the signs of first correlation function 361 and integrity correlation function 370 will remain the same.

In one embodiment, integrity ratio detector 320 and integrity lock component 330 can also be used to track peak 412 in conditions of degraded signal reception for GNSS receiver 300. For example, signal reception performance for satellite navigation receivers degrades rapidly in conditions where the satellite navigation signal is obscured, or in multi-path signal environments. An example of when a satellite navigation signal is obscured would be when GNSS receiver 300 is under a tree or other object which may encroach on a line of sight between GNSS receiver 300 and a navigation satellite generating a signal. An example of a multi-path environment would be in an urban area where signals from navigation satellites may be reflected from buildings and other surfaces. In these conditions, the amplitude of correlation function 361 rapidly decreases, thus making the detection of peaks 410, 411, and 412 more difficult. In other words, correlation function 361 can become flattened to such a degree as to make the detection of peaks 410, 411, and 412 more difficult. As a result, it is more difficult for GNSS receiver 300 to acquire and maintain a lock on peak 412. However, an embodiment of the present technology facilitates acquiring and maintaining a lock on peak on 412 in these conditions. For example, by examining integrity correlation function 370 in conjunction with correlation function 361, integrity lock component 330 can generate integrity detection signals 352 which facilitate maintaining a lock of peak 412 by indicating to GNSS receiver 300 whether the timing of PRN signal 306 should be advanced or delayed. In so doing, a lock can be maintained on peak 412 in conditions which degrade the reception of Galileo signal 301 to the point that it may not be possible to detect or track peak 412 of first correlation function 361.

Figure 5:
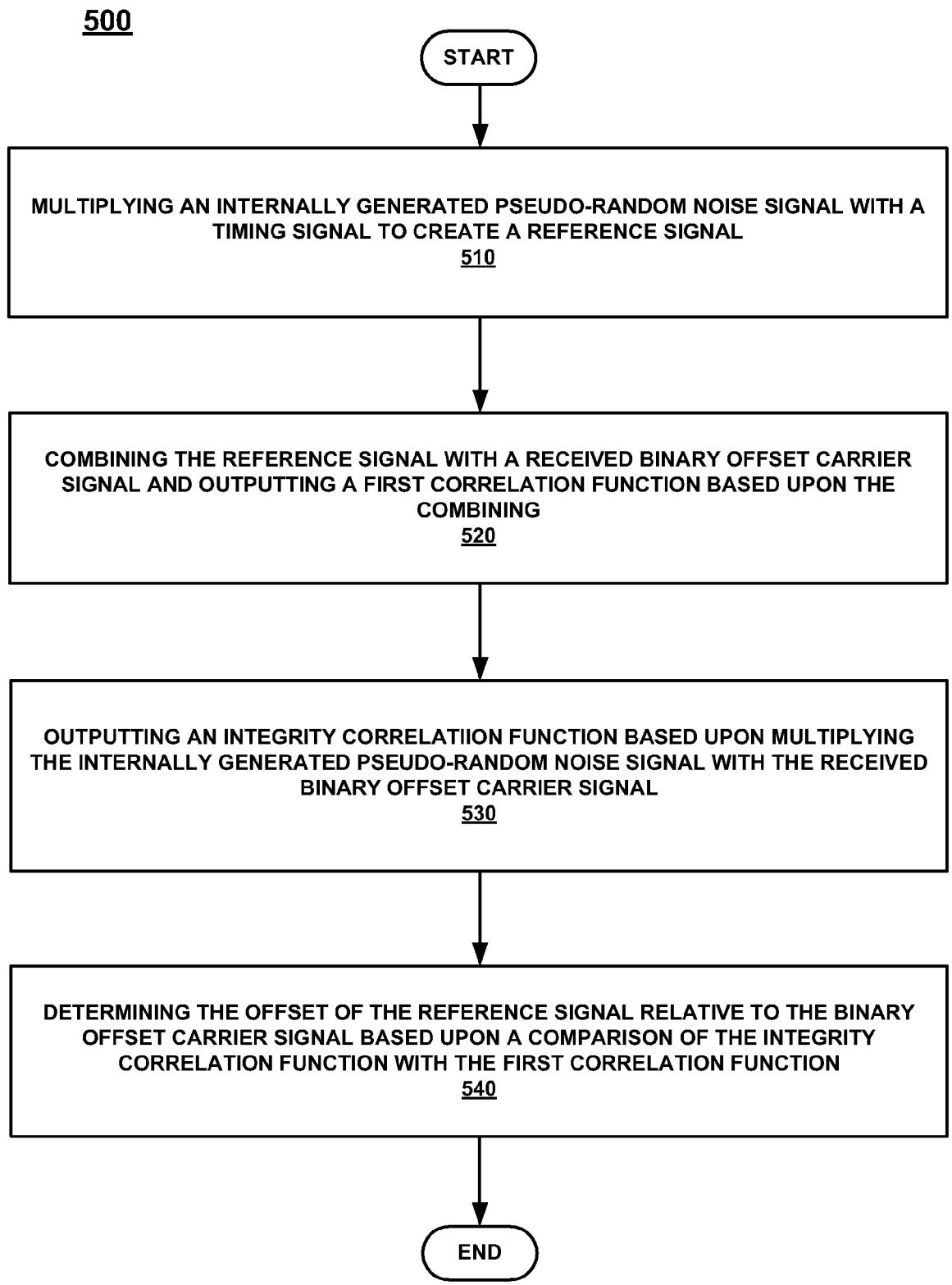
FIG. 5 is a flowchart of a method for maintaining integrity of a binary offset carrier signal in accordance with one embodiment.

FIG. 5 is a flowchart of a method for maintaining integrity of a binary offset carrier signal in accordance with an embodiment of the present technology. In operation 510 of FIG. 5, a timing signal is multiplied with an internally generated pseudo-random noise (PRN) signal to create a reference signal. As described above, first correlator 310 multiplies a clock signal received via mode select component 380 with PRN signal 306 to create a BOC (1,1) reference signal (e.g., 360). In another embodiment, first correlator 310 multiplies the PRN signal 306 with a timing signal in which clock signal 307 is summed with 6×1.023 MHz signal 382 to create a CBOC reference signal (e.g., 360). In another embodiment, first correlator 310 multiplies the PRN signal 306 with a timing signal in which clock signal 307 is selectively alternated with 6×1.023 MHz signal 382 to create a TMBOC reference signal (e.g., 360).

In operation 520 of FIG. 5, the reference signal is combined with a received Binary Offset Carrier (BOC) signal and a first correlation function is output based upon the combining. In one embodiment, received Galileo signal 301 comprises a BOC (1,1) signal which is generated by a navigation satellite. As described above, a BOC (1,1) signal is created when an internally generated PRN code is multiplied with a square wave such as a clock signal. As described above, in other implementations, the received Galileo signal 301 comprises one of the MBOC set of signals such as a CBOC signal or a TMBOC signal. Galileo navigation satellites utilize a BOC signal to improve multipath performance. However, as described above, the correlation function of a BOC signal (e.g., BOC (1,1), CBOC, and TMBOC) has three peaks which may be tracked in attempting to align the internally generated reference signal with the received Galileo signal 301.

In operation 530 of FIG. 5, an integrity correlation function is output based upon multiplying the internally generated PRN signal with the received BOC signal. As described above, second correlator 315 multiplies the internally generated PRN signal 306 with the received Galileo signal 301 to create integrity correlation function 370.

In operation 540 of FIG. 5, the offset of the reference signal relative to the BOC signal is determined based upon comparing the integrity correlation function with the first correlation function. As described above, integrity lock component 330 is configured to determine whether the offset of reference signal 360 relative to received Galileo signal 301 is correct, or if the timing of internally generated PRN signal 306 should be adjusted to correctly track peak 412 of first correlation function 361.

Embodiments of the present technology are thus described. While the present technology has been described in particular embodiments, it should be appreciated that the present technology should not be construed as limited to these embodiments alone, but rather construed according to the following claims.

What is claimed is:

1. A system for maintaining integrity of a binary offset carrier (BOC) signal, said system comprising:
   a first correlator configured for multiplying a timing signal with an internally generated pseudo-random noise (PRN) signal to create a reference signal and which is further configured for combining said reference signal with a received PRN signal and outputting a first correlation function based upon said combining;
   a second correlator configured for multiplying said internally generated PRN signal with said received PRN signal and for outputting an integrity correlation function; and
   an integrity lock component configured for determining the offset of said reference signal relative to said received PRN signal based upon comparing said integrity correlation function with said first correlation function.

2. The system of claim 1 wherein said reference signal is selected from the group consisting of a BOC (1,1) reference signal, a Composite Binary Offset Carrier (CBOC) reference signal, and a Time Multiplexed Binary Offset Carrier (TMBOC) reference signal.

3. The system of claim 1 further comprising an integrity ratio detector configured to determine a sign of said integrity correlation function and a sign of said first correlation function at a phase of said internally generated PRN signal.

4. The system of claim 3 wherein said integrity lock component is configured to compare said sign of said integrity correlation function with a sign of said first correlation function to determine the offset of said reference signal relative to said received PRN signal.

5. The system of claim 4 wherein said integrity lock component is further configured for determining that the offset of said reference signal relative to said received PRN signal exceeds a pre-determined parameter based upon comparing said first correlation function and said integrity correlation function.

6. The system of claim 5 wherein said integrity lock component is configured for determining that said sign of said integrity correlation function is the same as said sign of said first correlation function and for generating a signal to advance the timing of said internally generated PRN signal in response to said determining.

7. The system of claim 6 wherein said integrity lock component is further configured for determining that said sign of said integrity correlation function is opposite of said sign of said first correlation function and for generating a signal to delay the timing of said internally generated PRN signal in response to said determining.

8. The system of claim 7 wherein said integrity lock component if further configured to generate a signal indicating that the offset of said reference signal relative to said received PRN signal exceeds a pre-determined parameter.

9. The system of claim 4 wherein said integrity lock component is further configured for determining that the magnitude of said integrity correlation function is within a pre-determined range of a zero value of a correlation count of said first correlation function.

10. The system of claim 9 wherein said integrity lock component is further configured for generating a signal indicating that the offset of said reference signal relative to said first correlation function is within said pre-determined range.

11. The system of claim 1 further comprising a mode select component configured to selectively access said timing signal.

12. The system of claim 11 further comprising a Composite Binary Offset Carrier (CBOC) signal generating component communicatively coupled with said mode select component and configured to generate said timing signal.

13. The system of claim 11 further comprising a Time Multiplexed Binary Offset Carrier (TMBOC) signal generating component communicatively coupled with said mode select component and configured to generate said timing signal.

14. A computer implemented method for maintaining integrity of a binary offset carrier (BOC) signal, said method comprising:
   multiplying a timing signal with an internally generated pseudo-random noise (PRN) signal to create a reference signal;
   combining said reference signal with a received PRN signal and outputting a first correlation function based upon said combining;
   outputting an integrity correlation function based upon multiplying said internally generated PRN signal with said received PRN signal; and
   determining the offset of said reference signal relative to said received PRN signal based upon a comparison of said integrity correlation function with said first correlation function.

15. The method as recited in claim 14 wherein said creating said reference signal further comprises:
   creating a reference signal selected from the group consisting of of BOC (1,1) reference signal, a Composite Binary Offset Carrier (CBOC) reference signal, and a Time Multiplexed Binary Offset Carrier (TMBOC) reference signal.

16. The method as recited in claim 14 wherein said determining the offset of said reference signal relative to said received PRN signal further comprises:
   determining a sign of said integrity correlation function and sign of said first correlation function at a phase of said internally generated PRN signal.

17. The method as recited in claim 16 wherein said determining the offset of said reference signal relative to said received PRN signal further comprises:
   comparing said sign of said integrity correlation function with said sign of said first correlation function to determine said offset of said reference signal relative to said received PRN signal.

18. The method as recited in claim 17 further comprising:
   comparing said first correlation function with said integrity correlation function; and determining that the offset of said reference signal relative to said received PRN signal exceeds a pre-determined parameter based upon said comparing.

19. The method as recited in claim 18 wherein said determining further comprises:
    determining that said sign of said integrity correlation function corresponds to a sign of said first correlation function; and
    generating a signal to advance the timing of said internally generated PRN signal in response to said determining.

20. The method as recited in claim 19 wherein said comparing further comprises:
    determining that said sign of said integrity correlation function is opposite to a sign of said first correlation function; and
    generating a signal to delay the timing of said internally generated PRN signal in response to said determining.

21. The method as recited in claim 20 further comprising:
    generating a signal indicating that the offset of said reference signal relative to said received PRN signal exceeds a pre-determined parameter.

22. The method as recited in claim 17 further comprising:
    determining that the magnitude of said integrity correlation function is within a pre-determined range of a zero value of a correlation count of said first correlation function.

23. The method as recited in claim 19 further comprising:
    generating a signal indicating that the offset of said reference signal relative to said first correlation function is within a pre-determined range.

24. The method as recited in claim 14 further comprising:
    using a mode select component to selectively access said timing signal.

25. The method as recited in claim 24 further comprising:
    using a Composite Binary Offset Carrier (CBOC) signal generating component which is communicatively coupled with said mode select component to generate said timing signal.

26. The method as recited in claim 24 further comprising:
    using a Time Multiplexed Binary Offset Carrier (TMBOC) signal generating component communicatively coupled with said mode select component to generate said timing signal.

* * * * *

UNITED STATES PATENT AND TRADEMARK OFFICE
CERTIFICATE OF CORRECTION

PATENT NO. : 8,295,411 B2
APPLICATION NO. : 12/390115
DATED : October 23, 2012
INVENTOR(S) : Stuart Riley Page 1 of 1

It is certified that error appears in the above-identified patent and that said Letters Patent is hereby corrected as shown below:

In the Claims:

Column 12, Claim 15, Line 47: Delete "ing of of BOC (1,1) reference signal, a Composite"
Insert --ing of BOC (1,1) reference signal, a Composite--

Signed and Sealed this
Seventh Day of May, 2013

Teresa Stanek Rea
*Acting Director of the United States Patent and Trademark Office*